United States Patent Office 3,420,662
Patented Jan. 7, 1969

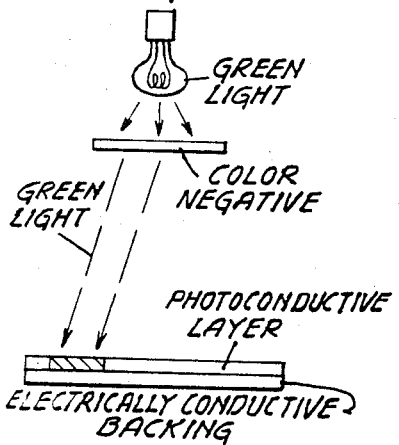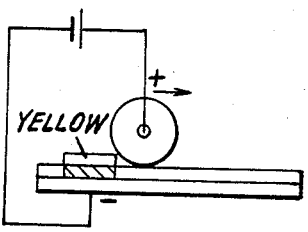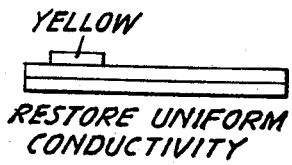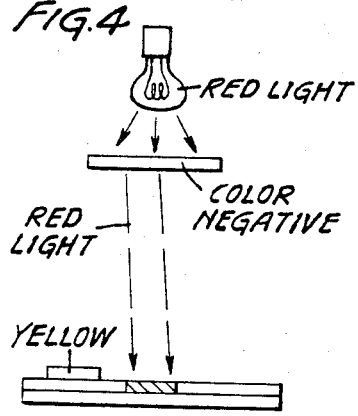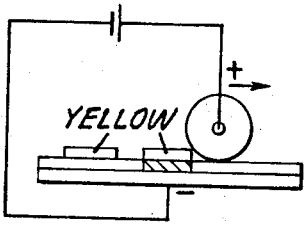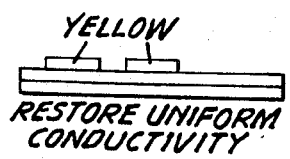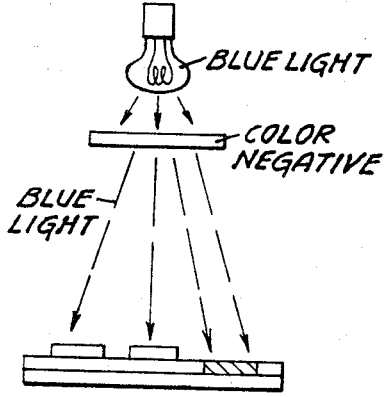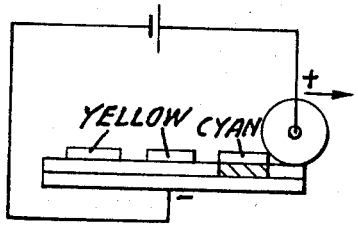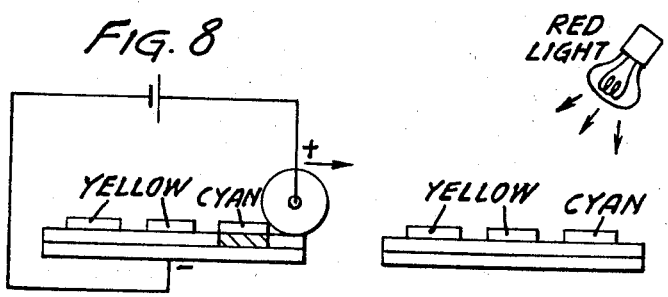

3,420,662
PROCESS FOR PREPARING A MASKED COLOR SEPARATION POSITIVE UTILIZING AN ELECTROPHOTOGRAPHIC PHOTOCONDUCTIVE COPYSHEET
Donald K. Meyer, West St. Paul, Minn., and Vsevolod Tulagin, Rochester, N.Y., assignors to Minnesota Mining and Manufacturing Company, St. Paul, Minn., a corporation of Delaware
Filed Apr. 7, 1965, Ser. No. 446,398
U.S. Cl. 96—30        5 Claims
Int. Cl. G03g 15/22; G03f 3/06

This invention relates to a process for preparing masked color separation positives. In one aspect this invention relates to an electrophotographic process for preparing masked color separation positives. In one particular embodiment a masked color separation positive is prepared by electrolytic electrophotographic techniques from a color negative.

It is conventional in the art of subtractive color printing to produce full color prints by successively printing images of cyan, magenta and yellow dye or pigment (commonly referred to as blue, red and yellow ink, respectively) onto an ink receptive surface such as paper. The density of each image, i.e. cyan, magenta and yellow, is inversely proportional to the brightness of the complementary color, i.e. red, green and blue, in the original. Ordinary photographic techniques have been employed to prepare red, green and blue color separations which are then used to prepare color prints or color printing plates. However, because of inherent limitations of color purity in available cyan, magenta and yellow inks, it is customary to employ masking techniques in order to achieve an improvement in color reproduction.

Ideally a cyan ink, dye or pigment should absorb only red light, magenta should absorb only green light, and yellow should absorb only blue light. In actual practice, however, most cyans also absorb green and blue to some extent, and magentas absorb some blue. To avoid color degradation resulting from such undesirable absorptions masking techniques are used to effect variations in density of a printing color, i.e. cyan, magenta and yellow, in accordance with the brightness not only of its complementary color but also of the other printing colors. In conventional photographic masking techniques separate masks are prepared and placed in register with the color separation in the production of a printing plate. Such techniques are complicated and expensive and require considerable time and skilled labor. The present invention provides a color masking process which is specifically adapted to electrophotography, i.e. both electrostatic and electrolytic imaging process, particularly to electrolytic electrophotography as described in U.S. 3,130,655, U.S. 3,154,414, U.S. Ser. No. 22,931, filed Apr. 18, 1960, now U.S. Patent 3,172,826; and U.S. Ser. No. 23,017, filed Apr. 18, 1960, now U.S. Patent 3,172,827.

It is an object of this invention to provide an electrophotographic process for preparing masked color separation positives.

Another object of the invention is to provide an electrolytic electrophotographic process for the preparation of masked color separation positives from a color negative.

Still another object of this invention is to provide an electrophotographic process for the preparation of masked color separation positives from a color positive.

Yet another object of this invention is to provide a process for the preparation of masked color separation positives which simplifies the problem of mask registration.

Other objects and advantages of the invention will be apparent from the following description.

FIGURES 1-9 schematically show the steps of preparing a masked yellow color separation positive from a color negative in accordance with this invention.

In the present invention it has been found that one or more low contrast positive masks can be provided by electrophotographic techniques on a photoconductive copysheet, a record of the desired color then being developed electrophotographically on the same sheet. The resulting separation record can be photographed to provide a black-and-white separation positive of the desired color, using conditions to eliminate interference from the masks. In the most simple case, when preparing masked color separation positives from a color negative in a printing process using printing inks of primary colors X and Y, the preparation of a black-and-white record for primary color X must compensate for the X component of the Y colored printing ink. This is accomplished by (1) exposing a white electrophotographic photoconductive copysheet sensitive to the color complements of X and Y through a color negative to light of the color complement of Y, thereby forming a differential conductivity pattern in said copysheet, and electrodeveloping the copysheet to provide dye of color X selectively on the light exposed areas of the copysheet in an amount sufficient to compensate for the X component of the Y colored printing ink, (2) removing said differential conductivity pattern in said copysheet and restoring said copysheet to a uniform photosensitivity, (3) exposing the copysheet through the color negative to light of the color complement of X, thereby forming a second differential conductivity pattern in said copysheet, and electrodeveloping the copysheet to provide selectively on the light exposed areas a colored material of a color which absorbs light freely transmitted by the dye of color X, and (4) photographing the copysheet in light of a color which is freely transmitted by the dye of color X and which is absorbed by the aforementioned colored material (step 3) and producing a black-and-white positive separation record for color X. When three or more printing inks are involved, the masking process for the X component of the Y colored printing ink (steps 1 and 2) may be followed by a similar masking procedure for the X component of the other printing inks, e.g. printing ink of primary color Z, using light of the color complement of Z and electrodeveloping to provide dye of color X on the light exposed areas of the copysheet surface.

To illustrate the above, a process for preparing a masked yellow color separation positive from a color negative suitable for use in conjunction with a printing process using cyan, magenta and yellow printing inks comprises the following steps:

(1) Exposing a panchromatically sensitive electrophotographic photoconductive copysheet through the color negative to green light to form a first differential conductivity pattern in the sheet (FIGURE 1) and electrodeveloping the exposed copysheet to provide yellow dye selectively on the green light exposed areas of the copysheet to compensate for the yellow component of the magenta printing ink (FIGURE 2), (2) Removing the first differential conductivity pattern in the sheet and restoring the sheet to uniform photosensitivity (FIGURE 3), (3) Exposing the copysheet through the color negative to red light to form a second differential conductivity pattern in the sheet (FIGURE 4) and electrodeveloping the copysheet to provide yellow dye selectively on the red light exposed areas to compensate for the yellow component of the cyan printing ink (FIGURE 5), (4) Removing the second differential conductivity pattern in the sheet and restoring uniform photosensitivity (FIGURE 6) and then sequentially, (5) Exposing the copysheet through the color negative to blue light (FIGURE 7) and electrodeveloping to provide selectively on the blue light exposed copysheet surface a colored material of a color which is capable of absorbing light freely transmitted by the yellow dye (e.g. cyan is most suitable, although magenta, blue or black can be used), as shown in FIGURE 8, and (6) Photographing the copysheet in light of a color which is freely transmitted by the yellow dye and which is absorbed by the aforementioned colored material (e.g. red light), as shown in FIGURE 9, and producing a black-and-white yellow positive separation record.

In the preparation of a magenta positive separation record, the mask for the green absorption of the cyan dye is produced by exposure through the color negative in red light with the low contrast image mask being electrophotographically formed by magenta dye. If a mask for the green absorption of the yellow dye is required, the copysheet should be first exposed to the color negative in blue light and developed by the electrophotographic formation of a magenta dye image, since the second mask exposure (made with red light) would not then be affected by the first magenta image. The magenta separation record, made in green light, can then be prepared by the formation of a cyan dye image. The black-and-white record is made by photographing the copysheet in red light to eliminate the magenta masks.

Normally the preparation of a cyan positive separation record does not require masking, since the red absorption of most yellow and magenta printing inks is low. However, if it is desired to correct for a slight red absorption of the magenta dye, the copysheet can first be masked by exposure through the color negative to green light followed by electrophotographic formation of a cyan dye mask. The red separation record must then be developed with a color other than cyan, e.g. red, yellow, magenta or black. To eliminate the cyan mask the copysheet would be photographed in light of a narrow region of the spectrum where the cyan dye has its least absorption.

Considering a visually neutral tone scale of contrast $\gamma N$ ($\gamma$ signifies gamma) formed by a combination of the yellow, magenta and cyan printing inks, the contribution of the contrasts of the individual images can be expressed as:

(1) $\gamma Y_b + \gamma M_b + \gamma C_b = \gamma N$
(2) $\gamma Y_g + \gamma M_g + \gamma C_g = \gamma N$
(3) $\gamma Y_r + \gamma M_r + \gamma C_r = \gamma N$ where $\gamma Y_b$, $\gamma Y_g$ and $\gamma Y_r$ are the contrasts of the yellow component measured in blue, green and red light, respectively, $\gamma M_b$, $\gamma M_g$ and $\gamma M_r$ are the contrasts of the magenta component measured in blue, green and red light, respectively, and $\gamma C_b$, $\gamma C_g$ and $\gamma C_r$ are the contrasts of the cyan component measured in blue, green and red light, respectively. Ideally, all characteristic curves being of the same shape $\gamma Y_b$, $\gamma M_g$ and $\gamma C_r$ should each be equal to $\gamma N$. However, because the printing inks frequently used have unwanted absorptions, the other quantities in Formulae 1, 2 and 3 have positive values, and $\gamma Y_b$, $\gamma M_g$ and $\gamma C_r$ are each somewhat less than $\gamma N$. In virtually all color processes using yellow, magenta and cyan dyes, pigments or inks the reproduction of the grey scale must be approximately correct, and this sets the proportional contributions (and hence the color contrasts) of the separate images. Since $\gamma Y_b$, $\gamma M_g$ and $\gamma C_r$ are less than that of $\gamma N$ (grey scale), the rates of change of dye density in colored images are lowered. Thus, when the dyes appear alone, or in any combination that is not neutral, the saturation of the colors they represent is lowered. The objective in masking is to raise the individual contrasts of the dye images when they appear alone, while maintaining the contrast of their combination in a neutral image at its original value.

The degree of masking is essentially arbitrary, although the requirements of pleasing color combination and also of conventional practice tend to narrow the choice. When the contrasts of the individual images, measured to their complementary colors, are to be raised to the level of the neutral contrast $\gamma N$, the contrasts of the individual images $\gamma Y_b$, $\gamma M_g$ and $\gamma C_r$ are therefore increased by factors $F_1$, $F_2$ and $F_3$ (greater than 1) to provide:

(4) $F_1 \gamma Y_b = \gamma N$
(5) $F_2 \gamma M_g = \gamma N$
(6) $F_3 \gamma C_r = \gamma N$ If the contrasts of the images on the color negative be represented by symbols with the superscript $n$, then $\gamma^n N$, $\gamma^n Y_b$, $\gamma^n M_g$ and $\gamma^n C_r$ represent the contrasts of the neutral, yellow, magenta and cyan images respectively, measured to their complementary colors. It is assumed that the color negative is fully masked for any deficiencies of its own dyes. $\gamma^p Y_b$, $\gamma^p M_g$ and $\gamma^p C_r$ represent the inherent contrasts of the photoconductive copysheet on which the separation records are made and must be calculated, and the superscript $p$ designates the photoconductive copysheet. Since $\gamma N$, $\gamma Y_b$, $\gamma M_g$ and $\gamma C_r$ have already been defined as the overall reproduction contrasts of the components in the neutral image without masking:

(7) $\gamma Y_b = \gamma^p Y_b \times \gamma^n Y_b$
(8) $\gamma M_g = \gamma^p M_g \times \gamma^n M_g$
(9) $\gamma C_r = \gamma^p C_r \times \gamma^n C_r$ with masking:

(10) $\gamma^p Y_b = \dfrac{F_1 \gamma Y_b}{\gamma^n Y_b} = \dfrac{\gamma N}{\gamma^n N}$

(11) $\gamma^p M_g = \dfrac{F_2 \gamma M_g}{\gamma^n M_g} = \dfrac{\gamma N}{\gamma^n N}$

(12) $\gamma^p C_r = \dfrac{F_3 \gamma C_r}{\gamma^n C_r} = \dfrac{\gamma N}{\gamma^n N}$ In the production of masks for the yellow separation positive the image contrast has been raised by the factor $F_1$. When the yellow ink is present in conjunction with cyan ink, the contrast in blue light of the combination will now be too high due to the additional blue absorption of the cyan ink. Similarly, in the presence of magenta ink, the unwanted absorption of the magenta ink will again make the contrast too high. In the neutral image, these effects are combined. Therefore, wherever cyan or magenta inks will be present in the final image, the quantity of yellow dye in the separation record must be reduced so that, in the neutral image, the contrast is reduced to that of the yellow image alone. If the contrast of the neutral image remains $\gamma N$, the contrasts (measured in blue light) of the unwanted components are $\gamma M_b$ and $\gamma C_b$. Compensation for the excess blue absorption is made by exposing the yellow separation record through low contrast masks that represent the distribution of magenta and cyan dye in the print. The contrast of the material on which the record is made is, as before:

(13) $\gamma^p Y_b = \dfrac{\gamma N}{\gamma^n N}$

The final contrast of the compensation for the unwanted absorption of the magenta image is $\gamma M_b$, and this contrast is produced on a print material of contrast $\gamma N / \gamma^n N$. Therefore,

(14) $\gamma^p Y_b \times \gamma^m M_b = \gamma M_b$ where the contrast of the mask image is designated by the superscript $m$, and

(15) $\gamma^m M_b = \dfrac{\gamma M_b \times \gamma^n N}{\gamma N}$

Similarly, the mask contrast for the blue absorption for the cyan dye is

(16) $$\gamma^m C_b = \frac{\gamma C_b \times \gamma^n N}{\gamma N}$$

These values represent the apparent contrasts of the masks when the separation record is made. Since the contrasts would be measured by reflection, not by transmission, the measured contrasts will be greater by a factor of about 2 than the actual contrasts as seen by the copysheet. The measured contrasts of the masks are therefore

(17) $$\text{measured } \gamma^m M_b = \frac{2 \times \gamma M_b \times \gamma^n N}{\gamma N}$$

(18) $$\text{measured } \gamma^m C_b = \frac{2 \times \gamma C_b \times \gamma^n N}{\gamma N}$$

In similar fashion, the mask contrasts to be used with the other separation records are:

Magenta separation

For the green absorption of the yellow ink:

(19) $$\text{measured } \gamma^m Y_g = \frac{2 \times \gamma Y_g \times \gamma^n N}{\gamma N}$$

For the green absorption of the cyan ink:

(20) $$\text{measured } \gamma^m C_g = \frac{2 \times \gamma Cg \times \gamma^n N}{\gamma N}$$

Cyan separation

For the red absorption of the magenta ink:

(21) $$\text{measured } \gamma^m M_r = \frac{2 \times \gamma M_r \times \gamma^n N}{\gamma N}$$

In the unlikely event of such a mask being used, for the red absorption of the yellow ink:

(22) $$\text{measured } \gamma^m Y_r = \frac{2 \times \gamma Y_r \times \gamma^n N}{\gamma N}$$

To illustrate the use of the above formulae a yellow printing ink was considered. Using three wavelengths of light (460, 530 and 650 $m\mu$) the following figures were measured $$\frac{\gamma C_g}{\gamma C_r} = 0.41; \frac{\gamma C_b}{\gamma C_r} = 0.21; \frac{\gamma M_r}{\gamma M_g} = 0.02$$

$$\frac{\gamma M_b}{\gamma M_g} = 0.46; \frac{\gamma Y_g}{\gamma Y_b} = 0.06; \frac{\gamma Y_r}{\gamma Y_b} = 0.01$$

If the final value of $\gamma N$ desired is 1.4 and the value of $\gamma^n N$ is 0.65, the known ratios of primary and secondary absorption and Equations 1, 2 and 3 provide the following $$\gamma Y_b = .75 \quad \gamma Y_g = .04 \quad \gamma Y_r = .01$$
$$\gamma M_b = .36 \quad \gamma M_g = .80 \quad \gamma M_r = .02$$
$$\gamma C_b = .29 \quad \gamma C_g = .56 \quad \gamma C_r = 1.37$$
$$\gamma N = 1.40 \quad \gamma N = 1.40 \quad \gamma N = 1.40$$

$$\text{measured } \gamma^m M_b = \frac{2 \times .36 \times .65}{1.4} = .334$$

$$\text{measured } \gamma^m C_b = \frac{2 \times .29 \times .65}{1.4} = .270$$

$$\gamma^p Y_b = \frac{\gamma N}{\gamma^n N} = \frac{1.4}{.65} = 2.15$$

These figures provide the required contrasts of the copysheet on which the yellow separation record is made and the contrasts of the two masks. Exposure and development of the copysheet by electrophotographic techniques can be controlled to provide these required contrasts.

The electrophotographic techniques may include both electrolytic and electrostatic techniques. Electrolytic electrophotographic techniques generally are negatively acting (i.e. produce a positive from a negative, and conversely) whereas electrostatic electrophotographic techniques can be positively or negatively acting. Such techniques are well known and need no further elaboration. The electrolytic electrophotographic method for development of the masks and separation record is preferred because it is uniquely able to provide outstanding continuous tone rendition in a full color print. The removal of differential conductivity images from electrolytic electrophotographic copysheets and the restoration of uniform photosensitivity can be achieved by heating the copysheet, a preferred procedure being to contact the sheet with liquid water heated to at least 100° F., as described in U.S. 3,154,414.

Various other embodiments of the present invention will be apparent to those skilled in the art without departing from the scope thereof.

The embodiments of the invention in which an exclusive property or privilege is claimed are defined as follows:

1. A process for preparing a masked color separation positive from a color negative suitable for use in conjunction with a printing process using printing inks of primary colors X and Y, said masked color separation positive to constitute a black-and-white record for primary color X, which comprises:

(1) Exposing an electrophotographic photoconductive copysheet sensitive to the color complements of X and Y through said color negative to light of the color complement of Y thereby forming a differential conductivity pattern in said copysheet, and electrodeveloping said copysheet to provide dye of color X selectively on the light exposed areas of the copysheet in an amount sufficient to compensate for the X component of the Y colored printing ink, (2) Removing said differential conductivity pattern in said copysheet and restoring said copysheet to a uniform photosensitivity, (3) Exposing said copysheet through said color negative to light of the color complement of X, thereby forming a second differential conductivity pattern in said copysheet, and electrodeveloping said copysheet to provide selectively on its light exposed areas a colored material of a color which is capable of absorbing light freely transmitted by said dye of color X, and (4) Photographing said copysheet in light of a color which is freely transmitted by said dye of color X and which is absorbed by the aforesaid colored material and producing a black-and-white positive separation record for color X.

2. A process for preparing a masked color separation positive from a color negative suitable for use in conjunction with a printing process using printing inks of primary colors X, Y and Z, said masked color separation positive to constitute a black-and-white record for primary color X, which comprises:

(1) Exposing an electrophotographic photoconductive copysheet sensitive to the color complements of X, Y and Z through said color negative to light of the color complement of Y, thereby forming a differential conductivity pattern in said copysheet, and electrodeveloping said copysheet to provide dye of color X selectively on the light exposed areas of the copysheet and compensate for the X component of the Y colored printing ink, (2) Removing said differential conductivity pattern in said sheet and restoring said copysheet to a uniform photosensitivity, (3) Exposing said copysheet through said color negative to light of the color complement of Z, thereby forming a second differential conductivity pattern in said copysheet, and electrodeveloping said copysheet to provide dye of color X selectively on the light exposed areas of the copysheet and compensate for the X component of the Z colored printing ink, (4) Removing said second differential conductivity pattern in said sheet and restoring said copysheet to a uniform photosensitivity, (5) Exposing said copysheet through said color negative to light of the color complement of X, thereby forming a third differential conductivity pattern in said copysheet, and selectively electrodeveloping said copysheet to provide selectively on its light exposed areas a colored material of a color which is capable of absorbing light freely transmitted by said dye of color X, and (6) Photographing said copysheet in light of a color which is freely transmitted by said dye of color X and which is absorbed by the aforesaid colored material and producing a black-and-white positive separation record for color X.

3. A process for preparing a masked yellow color separation positive from a color negative suitable for use in conjunction with a printing process using cyan, magenta and yellow printing inks, which comprises:

(1) Exposing a panchromatically sensitive electrophotographic photoconductive copysheet through said color negative to green light, thereby forming a differential conductivity pattern in said copysheet, and electrodeveloping said copysheet to provide yellow dye selectively on said green light exposed areas of said copysheet to compensate for the yellow component of the magenta printing ink, (2) Removing said differential conductivity pattern in said sheet and restoring said copysheet to a uniform photosensitivity, (3) Exposing said copysheet through said color negative to red light, thereby forming a second differential conductivity pattern in said copysheet, and electrodeveloping said copysheet to provide yellow dye selectively on its red light exposed areas to compensate for the yellow component of the cyan printing ink, (4) Removing said second differential conductivity pattern in said sheet and restoring said copysheet to a uniform photosensitivity, (5) Exposing said copysheet through said color negative to blue light, thereby forming a third differential conductivity pattern in said copysheet, and electrodeveloping said copysheet to provide selectively on its blue light exposed areas a colored material of a color which is capable of absorbing light freely transmitted by said yellow dye, and (6) Photographing said copysheet in light of a color which is not absorbed by said yellow dye and which is absorbed by the aforesaid colored material and producing a black-and white yellow positive separation record.

4. A process for preparing a masked magenta color separation positive from a color negative suitable for use in conjunction with a printing process using cyan, magenta and yellow printing inks which comprises:

(1) Exposing a red and green sensitive electrophotographic photoconductive copysheet through said color negative to red light, thereby forming a differential conductivity pattern in said copysheet, and electrodeveloping said copysheet to provide magenta dye selectively on the red light exposed areas thereof to compensate for the magenta component of the cyan printing ink.

(2) Removing said differential conductivity pattern in said sheet and restoring said copysheet to a uniform photosensitivity, (3) Exposing said copysheet through said color negative to green light, thereby forming a second differential conductivity pattern in said copysheet and electrodeveloping said copysheet to provide selectively on the green light exposed areas thereof a colored material of a color which is capable of absorbing light freely transmitted by said magenta dye, and (4) Photographing said copysheet in a light of a color which is not absorbed by said magenta dye and which is absorbed by the aforesaid colored material and producing a black-and-white magenta separation record.

5. A process for preparing a masked magenta separation positive from a color negative suitable for use in conjunction with a printing process using cyan, magenta and yellow printing inks which comprises:

(1) Exposing a panchromatically sensitive electrophotographic photoconductive copysheet through said color negative to blue light, thereby forming a differential conductivity pattern in said copysheet and electrodeveloping said copysheet to provide magenta dye selectively on blue light exposed areas thereof to compensate for the magenta component of the yellow printing ink.

(2) Removing said differential conductivity pattern in said sheet and restoring said copysheet to a uniform photosensitivity, (3) Exposing said copysheet through said color negative to red light, thereby forming a second differential conductivity pattern in said copysheet, and electrodeveloping said copysheet to provide magenta dye selectively on the red light exposed areas thereof to compensate for the magenta component of the cyan printing ink, (4) Removing said second differential conductivity pattern in said sheet and restoring said copysheet to a uniform photosensitivity, (5) Exposing said copysheet through said color negative to green light, thereby forming a third differential conductivity pattern in said copysheet, and electrodeveloping said copysheet to provide selectively on the green light exposed areas thereof a colored material of a color which is capable of absorbing light freely transmitted by said magenta dye, and (6) Photographing said copysheet in a light of a color which is not absorbed by said magenta dye and which is absorbed by the aforesaid colored material and producing a black-and-white magenta separation record.

References Cited

UNITED STATES PATENTS 3,253,913   5/1966   Smith et al. _____ 96—1
3,329,590   7/1967   Renprew _____ 204—18

NORMAN G. TORCHIN, Primary Examiner.

JOHN C. COOPER, III, Assistant Examiner.

U.S. Cl. X.R.

96—1.2, 5